H. & G. BUTTRESS.
PRESSURE GAGE.
APPLICATION FILED AUG. 25, 1909.
1,073,734.
Patented Sept. 23, 1913.
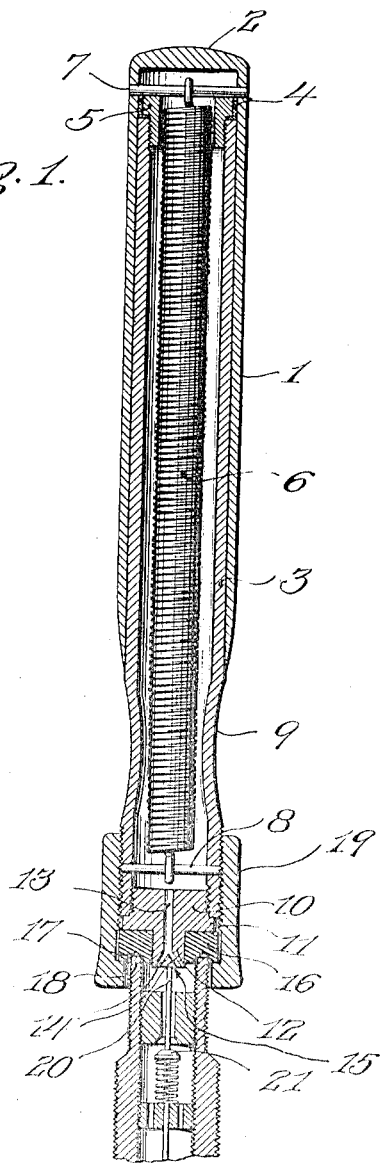
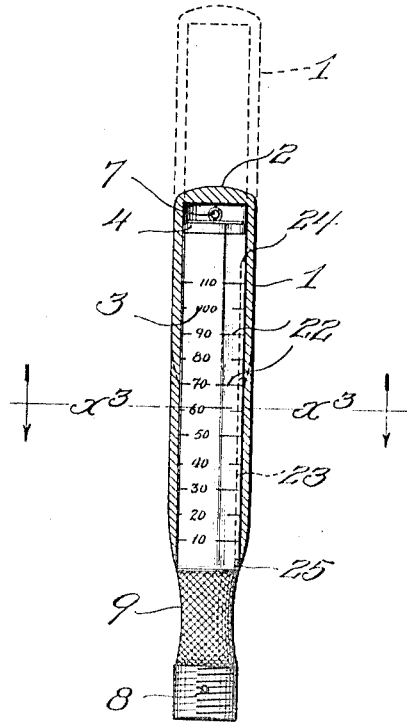
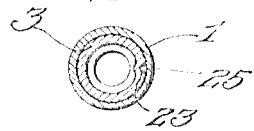
Witnesses.
Geo. J. Huting.
Louis W. Gratz.
Inventors.
George Buttress.
Howard Buttress.

UNITED STATES PATENT OFFICE.

HOWARD BUTTRESS AND GEORGE BUTTRESS, OF LOS ANGELES, CALIFORNIA.

PRESSURE-GAGE.

1,073,734.  Specification of Letters Patent.  Patented Sept. 23, 1913.

Application filed August 25, 1909.  Serial No. 514,630.

*To all whom it may concern:*

Be it known that we, HOWARD BUTTRESS and GEORGE BUTTRESS, both citizens of the United States, residing at Los Angeles, in the county of Los Angeles and State of California, have invented new and useful Improvements in Pressure-Gages, of which the following is a specification.

This invention relates to a pressure gage designed particularly for determining the pressure of air in an automobile tire, and one of the main objects of the invention is to produce a pressure gage of this character which is of extremely simple construction, compact, light in weight, and which may readily be applied to the valve of the tire to determine the pressure.

A further important object of the invention is to provide for securing a perfect air-tight connection with the rim of the valve, so that air is prevented from escaping and the full pressure from the tire is caused to pass into the gage, and to secure this perfect airtight union by a particular construction of the contacting portion of the gage, which will produce this close and airtight union by simply pressing the gage against the end of the valve.

A further object is to construct the gage of telescopic tubular members, providing a continuous chamber extending nearly the entire length of the gage which will receive a spring of maximum length which is desirable for producing accurate registration of pressure, short springs being less accurate.

Referring to the drawings:—Figure 1 is an enlarged, longitudinal, cross section through the gage, showing the manner of applying the gage to the valve. Fig. 2 is a side elevation with the outer tube in section. Fig. 3 is a section on line $x^3$—$x^3$ Fig. 2.

The pressure gage comprises an outer tube 1 with a closed head 2, the outer tube 1 closely fitting and telescoping with an inner tube 3. The outer and inner tubes 1 and 3 constitute a closed air chamber which is extensible in length by sliding the outer tube 1 upwardly, and in order to render such chamber airtight a cupped leather 4 is provided at the end of the inner tube 3 to seal the joint between the inner tube 3 and the outer tube 1, the cupped leather 4 being held against the end of the inner tube 3 by a shouldered plug 5 which is screwed into the end of the inner tube 3. Pressure within the chamber formed by the two tubes 1 and 3 acts to press the sides of the cupped leather 4 outwardly into close contact with the outer tube 1 and thus prevent leakage.

The outer tube 1 is normally held retracted by coiled tension spring 6, the upper end of which is secured to a pin 7 which extends diametrically through the upper part of the outer tube 1, while the lower end of the spring is secured to a pin 8 which extends through the lower end of the tube 3. The plug 5 projects slightly above the cupped leather 4 and acts as a stop for the pin 7 to strike against without touching the edge of the cupped leather 4 when the outer tube 1 is retracted by the spring. The hole through the plug 5 is slightly larger than the spring 6 and acts to hold the upper end of the spring 6 in central position. The lower portion of the inner tube 3 is formed with a circumferential concave shallow groove 9 knurled externally to form a finger grip. Screwed in the lower end of the inner tube 3 is a plug 10 which has a flange 11 which strikes against the end of the tube 3 and is also formed with a central projecting stud 12. An air passage 13 extends longitudinally of the plug 10 and stud 12, and near the end of the latter the passage 13 forks into two branches 14, so that a solid metal portion 15 is left in the center of the stud 12. Encircling the stud 12 is a rubber disk 16, the outer face of which is provided with an annular groove 17, V-shaped in cross section, which is adapted to fit over the rim 18 of the valve of a pneumatic tire.

An important feature of this invention is that the portion of the rubber disk 16 which contacts with the rim 18 is an annular channel or groove formed in disk 16, so that both sides of the rim 18 are brought into intimate contact with both walls of the groove 17 so that a perfect airtight union is effected between the rubber disk 16 and the valve rim 18, which union is not perfect were only the outer edge of the rim 18 to contact with the rubber disk 16. By constructing the rubber disk 16 with the groove 17 a perfect airtight union is always produced between the pressure gage and the rim 18 of the valve, even though the pressure gage be tilted somewhat in any direction out of line with the axis of the valve. In other words, this construction does not necessitate the pressure gage being held in perfect alinement with the valve in order to secure a perfect airtight fit. This feature of the invention is of considerable importance and value because unless a perfect airtight fit is produced between the valve and the pressure gage some of the air will escape at this point and the full pressure of the air in the tire will not be transmitted into the gage and the gage will thus not register accurately. From this it will be observed that the present construction increases the accuracy of the gage. The rubber disk 16 is retained by an internally shouldered ferrule 19 which is screwed to the lower end of the inner tube 3.

As the gage is applied to the valve the stud 12 presses against the end of the valve stem 20 and depresses the latter, opening the valve 21 to permit air to pass outward through the valve, through the branch passages 14 and central passage 13 into the interior of the gage. The solid metal portion 15 of the stud 12 contacts with the valve stem 20 so that the two branch air passages 14 are unobstructed and permit the free passage of air therethrough, and it is preferred to have the stud 12 project slightly beyond the face of the rubber disk 16 so that it will be sure to depress the valve stem 20 sufficiently to open the valve, even in cases where the stem 20 is somewhat shorter. However, ordinarily in valves of this type the stem 20 protrudes slightly above the rim 18 when the valve is closed.

When the gage is applied to the valve in the manner indicated, the valve 21 having been opened by the stud 12, as stated, the air from the valve passes into the gage and forces out the outer tube 1, thus elongating the air chamber within the gage, the outer tube 1 being extended until the increased tension of the spring 6 exerts a retaining power on the outer tube 1 which is equal to the pressure of the air, and at this point outward movement of the outer tube 1 is arrested and the amount of pressure may be read from the graduations 22 which are provided on the inner tube 3, the highest graduation revealed by the lower rim of the outer tube 1 representing the pressure. In order to positively limit the outward movement of the tube 1, and also to prevent revoluble movement thereof with respect to the inner tube, a longitudinal groove 23 is formed in the inner tube 3, the upper end of the groove terminating at a shoulder 24, and a projection 25 extends from the outer tube 1 into the groove 23 and slides in the groove as the outer tube 1 slides. The shoulder 24 acts as a stop against which the projection 25 strikes to prevent further outward movement of the tube. If desired the graduations 22 may be arranged in three rows on the inner tube 3 so as to be easily read after the gage has been applied to the tire valve without the necessity of turning the gage around to bring a row of graduations into view.

Fig. 2 shows two rows of the graduations, the third row being on the opposite side of the tube and hence hidden.

What we claim is:

1. A pressure gage comprising an inner tube, an outer tube slidable thereon, a spring within the tubes connected to the respective tubes near their opposite ends, a cupped leather on the inner end of the inner tube bearing against the outer tube, a shouldered plug screwed to the end of the inner tube and retaining the cupped leather, air inlet means at the other end of the inner tube, and means for indicating the extension of the outer tube.

2. A pressure gage comprising an inner tube, an outer tube slidable thereon, a spring within the tubes connected to opposite ends of the tubes, packing means at the inner end of the inner tube preventing leakage, a plug screwed in the lower end of the inner tube, said plug having a central stud and formed with an air passage with two branches in the stud leaving a central solid portion on the stud adapted to contact with the valve stem of the tire, a rubber disk encircling said stud and having an annular groove and means for indicating the extension of the outer tube, a shouldered ferrule screwed on the end of the inner tube and retaining the rubber disk.

3. A pressure gage comprising an inner tube, an outer tube slidable thereon, a spring within the tubes connected to the respective tubes near their outer ends, a cupped leather on the inner end of the inner tube bearing against the outer tube, a shouldered plug screwed to said end of the inner tube and retaining the cupped leather, air inlet means at the outer end of the inner tube, and means for indicating the extension of the outer tube, said plug extending above the cupped leather, and a pin in the tube to which the spring is attached, said plug adapted to strike against said pin.

In testimony whereof, we have hereunto set our hands at Los Angeles, California, this 19th day of August, 1909.

HOWARD BUTTRESS.
GEORGE BUTTRESS.

In presence of—
G. T. HACKLEY,
FRANK L. A. GRAHAM.